United States Patent [19]
Schobert-Csongor et al.

[11] Patent Number: 5,749,649
[45] Date of Patent: May 12, 1998

[54] SATELLITE EXTRUDER ARRANGEMENT FOR POLYMER MELT MIXING WITH A DYNAMIC MIXER

[75] Inventors: Desider G. Schobert-Csongor, Manchester; Nick Reinhold Schott, Westford, both of Mass.

[73] Assignee: Dynamic Mixers Inc., Manchester, Mass.

[21] Appl. No.: 611,453

[22] Filed: Mar. 5, 1996

[51] Int. Cl.⁶ .................... B29B 7/40; B01F 7/08
[52] U.S. Cl. .................. 366/76.4; 366/80; 366/88; 425/205
[58] Field of Search ................ 366/69, 75, 76.1, 366/76.3, 76.4, 76.6, 76.7, 76.8, 79, 80, 81, 82, 88, 90, 191, 154.1, 156.1, 157.1, 172.2, 157.3, 157.4; 425/200, 205, 208, 209, 204

[56] References Cited

U.S. PATENT DOCUMENTS

| | | | |
|---|---|---|---|
| 3,632,255 | 1/1972 | Geyer | 425/205 |
| 3,751,527 | 8/1973 | Bortnick | 425/205 |
| 3,868,093 | 2/1975 | Sokolow | 366/76.6 |
| 4,408,887 | 10/1983 | Yamaoka | 366/75 |
| 4,697,928 | 10/1987 | Csongor | 366/90 |
| 4,723,901 | 2/1988 | Sarumaru | 366/80 |
| 4,749,279 | 6/1988 | Csongor | 366/80 |
| 4,776,784 | 10/1988 | Batiuk | 366/88 |
| 5,217,303 | 6/1993 | Geyer | 366/88 |
| 5,259,749 | 11/1993 | Meixner et al. | 425/205 |
| 5,486,327 | 1/1996 | Bemis et al. | 366/76.6 |

FOREIGN PATENT DOCUMENTS

| | | | |
|---|---|---|---|
| 2141068 | 12/1984 | United Kingdom | 366/88 |

*Primary Examiner*—Tony G. Soohoo
*Attorney, Agent, or Firm*—Don Halgren

[57] ABSTRACT

The present invention comprises an extrusion arrangement for the controlled compounding and mixing of a plurality of time, pressure and condition sensitive substances in a single screw plastic extrusion machine, having a main support shaft connected to the downstream end of a single screw plastic extrusion machine, the support shaft enclosed within a barrel shaped housing, at least one stator and one rotor being disposed about the support shaft within the barrel shaped housing, and at least one satellite extrusion feeder arranged to supply an additive to the barrel shaped enclosure through an introduction port, the introduction port arranged at a location radially adjacent a rotor on its support shaft.

10 Claims, 3 Drawing Sheets

SATELLITE EXTRUDER ARRANGEMENT FOR POLYMER MELT MIXING WITH A DYNAMIC MIXER

BACKGROUND OF THE INVENTION

1. Field of the Invention

This invention relates to mixing of a fluid or plastic mass with a plurality of extruders to produce a homogeneous output material.

2. Prior Art

It is desired to mix a number components together, to make a combination of plastics thereof. Mixing components in a screw extruder, either a single or a twin screw machine, will often compromise the result of the mix. Some components are sensitive to temperature, pressure, or shear. Adding those components to the feed line of an extruder may therefore result in an incomplete or unsatisfactory discharge therefrom.

It is an object of the present invention to a provide a mixing arrangement which will permit numerous components to be added to an extrusion in-process on a dynamic melt mixer machine.

It is a further object of the present invention to provide a mixing arrangement which will permit customized process mixing and extrusion of a plurality of components, each component added to the system at its optimum location and at its optimum condition for the process being worked.

It is yet a further object of the present invention to provide a customizable mixing and extrusion arrangement which can be readily tested at successive stages of the mixing/melting process to permit alteration of component characteristics on "as-you-go" basis.

It is yet a still further object of the present invention to provide a mixing/melting extrusion apparatus which may be readily adapted to various material dwell times within its mixing and melting chamber, even as such apparatus is retro-fitted onto existing single screw main extrusion machines.

Earlier U.S. Pat. Nos. 4,749,279 entitled "Modular Mixing Apparatus for Extruding Material Including Rotoring for Processing Modules having Variable Speed Independent Drive Means" and 4,447,156 entitled "Modular Mixing Apparatus Including Interchangeable Fluid Processing Means" each relating to apparatus utilizable with the present invention, and each incorporated herein by reference, in their entirety.

BRIEF SUMMARY OF THE INVENTION

The present invention includes a single screw main extruder to which is attached a dynamic mixer/extruder at its downstream end. The dynamic mixer has a plurality of satellite units feedingly disposed there along. A dynamic mixer extruder has a downstream end with an extrusion die thereon. The main screw extruder has an upstream end with a main shaft, the proximal end which is attached to a reduction gearing. The reduction gearing is driven by a motor, all of which are mounted on a bedplate. The main screw is mounted within an elongated barrel, the barrel having a feedhopper through which meltable, mixable material is disposed, so as to enter the barrel and be conveyed, plasticated and metered by the main screw. A transition portion comprises the next downstream section from the feed portion of the main extruder.

The dynamic mixer comprises a main shaft which has a proximal end which is threadably engaged with the downstream or distal end of the main screw of the single screw extruder apparatus. The main shaft of the dynamic mixer extruder has a plurality of stators and rotors spaced alternately thereon, from its upstream end to its distal most downstream end. The main shaft with the rotors thereon, is caused to rotate due to the mating between the main shaft of the dynamic mixer extruder and the downstream end of the extruder screw of the single screw extruder. The dynamic mixer extruder includes a housing which rotatively supports the main shaft therewithin. The housing has a plurality of feedports spaced at longitudinally spaced apart location therethrough.

Each feed port through the housing of the dynamic mixer extruder, may have a satellite extruder thereattached. Each satellite extruder feeding into the housing of the dynamic mixer, has its own individual control panel and drive unit, which includes a transmission and motor for propelling a minor screw extruder shaft there within. Each minor screw extruder shaft in each satellite extruder has a hopper feed arrangement at its upstream end.

Each satellite extruder may have a supplemental feed port through a housing barrel therearound, which supplemental feed port may supply high pressure liquid or gas, for introduction through that particular satellite extruder, into the housing of the dynamic mixer.

The feed port from each satellite extruder is arranged to be disposed radially adjacent a rotor mounted on the main shaft within the dynamic mixer extruder. Each stator is maintained in a static relationship with respect to the barrel of the dynamic mixer housing. The stator may be frictionally engaged within the annular interior of the dynamic mixer housing, by virtue of its expansion coefficient being greater than the expansion coefficient of the dynamic mixer housing when the unit gets warm, or the stator may be held in place by a locking means such as a bolt extending through the dynamic mixer housing.

A plurality of sampling ports may be disposed circumferentially adjacent to each feed port, which is also radially outward of each rotor. Each sampling port may be comprised of a bore extending through the elongated housing in the barrel of the dynamic mixer extruder. Each portion of that elongated housing going radially outwardly from each rotor, may have such sampling ports therearound.

Each stator has a longitudinal bore therethrough, in which the main shaft of the dynamic mixer rotates. The bore within each stator defines an annular surface, each annular surface having a plurality of right-handed or left-handed channels machined therein. Each channel is helically disposed so as to provide circumferential as well as a longitudinal flow to the extruded plastic material forced therethrough. Each rotor rotatively disposed about the main shaft and longitudinally adjacent to its respective stator, has a plurality of circumferentially spaced blades thereon. Each blade has a right-handed or left-handed helical disposition, corresponding to the right-handed or left-handed disposition of the grooves in its adjacent upstream stator.

In a further embodiment of the present invention, the blades of any given rotor may be slightly less helically disposed than are the channels of its upstream adjacent stator. The difference in angularity of the blades with respect to the angle of the helically disposed channels, permits a slight change in pressure and flow rate of extrudate being mixed thereby. The change in flow rate, permits a change in dwell time of the extrudate within the shear area of the dynamic mixer extruder barrel, permitting customizable mixing and extrusion within different portions of the dynamic mixer extruder itself.

By virtue of a plurality of satellite extruders as mentioned hereinabove, plasticizers, elastomers, compatabalizers, lubricants, colorants, inks, gas may be injected at any of a plurality of locations and under any of a plurality of operating perameters within the dynamic mixer barrel to permit a fundamentally customizable melting and mixing extrusion apparatus.

An extrusion die, disposed at the orifice of the downstream or distalmost end of the dynamic mixer barrel may have a choke arrangement thereon to further enhance the dwell time of any extrudate passing therethrough.

A unique arrangement is therefore shown, wherein a plurality of satellite extruders are feedingly mated with the barrel of a dynamic mixer, to permit a wide variety of additives and mixed components to be fed into the ongoing plasticized stream, the dynamic mixer also permitting conditions to be easily monitored and sampled along the entire length of the process.

The invention therefore comprises an extrusion arrangement for the controlled compounding and mixing of a plurality of time, pressure and condition sensitive substances in a single screw plastic extrusion machine, comprising a dynamic mixer main support shaft connected to the downstream end of a single screw plastic extrusion machine, the support shaft enclosed within a barrel shaped housing, at least one stator and one rotor being disposed about the support shaft, within the barrel shaped housing, and at least one satellite extrusion feeder arranged to supply an additive to the barrel shaped enclosure through an introduction port, the introduction port arranged at a location radially adjacent a rotor on its support shaft. Each of the stators on the support shaft has an internal bore therethrough, the internal bore having a plurality of helically disposed channels machined thereon, and each of the rotors has a plurality of blades circumferentially disposed therearound, each of the blades having a helical disposition thereto, the stators and rotors being removably mounted on the support shaft to permit removal therefrom and reversal thereon, to change the handedness of the helical disposition thereof. A sampling port is arranged at the lowermost circumferential location on the housing radially adjacent at least one of the rotors. The sampling port has a feed line therewith, to permit the introduction of additives to locations in the barrel contiguous to the rotors. The support shaft of the dynamic mixer may itself have a bore longitudinally arranged therethrough, for the introduction of components into the barrel from its upstreram end, via radial conduits in that support shaft, or at its distalmost downstream end.

The stators are loose with respect to the support shaft, and are held in a static relationship with respect to the barrel of the dynamic mixer by a bolt extending through the barrel of the dynamic mixer, and against the stator. The support shaft may have a lefthanded helical stator mounted longitudinally downstream of a kneading block and also a righthanded helical stator, to provide dispersive mixing and retarding of the flow of plastic therethrough by the opposite handedness of the neighboring rotors at a confined location within the barrel. An additive port is radially adjacent the downstreammost rotor in the barrel, so as to permit the introduction of sensitive additives having rapid degradation properties from otherwise losing their important characteristics such as color or viscosity.

The satellite extruder is attached to the introduction port through a flexible conduit therebetween, to permit movement and adjustment of the components comprising the system.

The satellite extruder may be attached to the introduction port through a rigid conduit disposed at an acute angle with respect to the axis of the barrel, to minimize the agitation of any additive introduced thereat. The satellite extruder has a high pressure pump in communication therewith, to permit a fluid to be introduced into the satellite extruder prior to it being introduced into the barrel of the mixer.

The invention also includes a method of mixing a plurality of compounds on a single screw extrusion machine comprising the steps of: attaching a barrel of a dynamic mixer apparatus onto the downstream end of a barrel of the single screw extrusion machine, so as to be in plastic fluid communication therewith; arranging a support shaft in the dynamic mixer apparatus to rotatively carry a plurality of rotors and stators within its barrel; machining at least one introduction port through the barrel of the dynamic mixer apparatus, radially adjacent at least one of the rotors therein; and attaching a satellite extrusion mixer to the introduction port to permit the introduction of additives into any mixing process taking place within the barrel at a desired location where such introduction is best suited for that particular additive.

The method also includes the steps of using an introduction port as a withdrawal port in order to take samples of any mix of any material passing through the barrel of the dynamic mixer apparatus, removing a rotor from the support shaft of the dynamic mixer apparatus, and returning on the shaft after turning its longitudinal axis 180 degrees, so as to present the shaft with a rotor of opposite hand to provide flow retarding characteristics thereto. The method includes the steps of arranging a sampling port the lowermost portion of the barrel on the dynamic mixer apparatus, radially adjacent one of said rotors therein.

BRIEF DESCRIPTIONS OF THE DRAWINGS

The objects and advantages of the present invention will become more apparent, when viewed in conjunction with the following drawings, in which.

DESCRIPTION OF THE PREFERRED EMBODIMENTS

Figure 1:
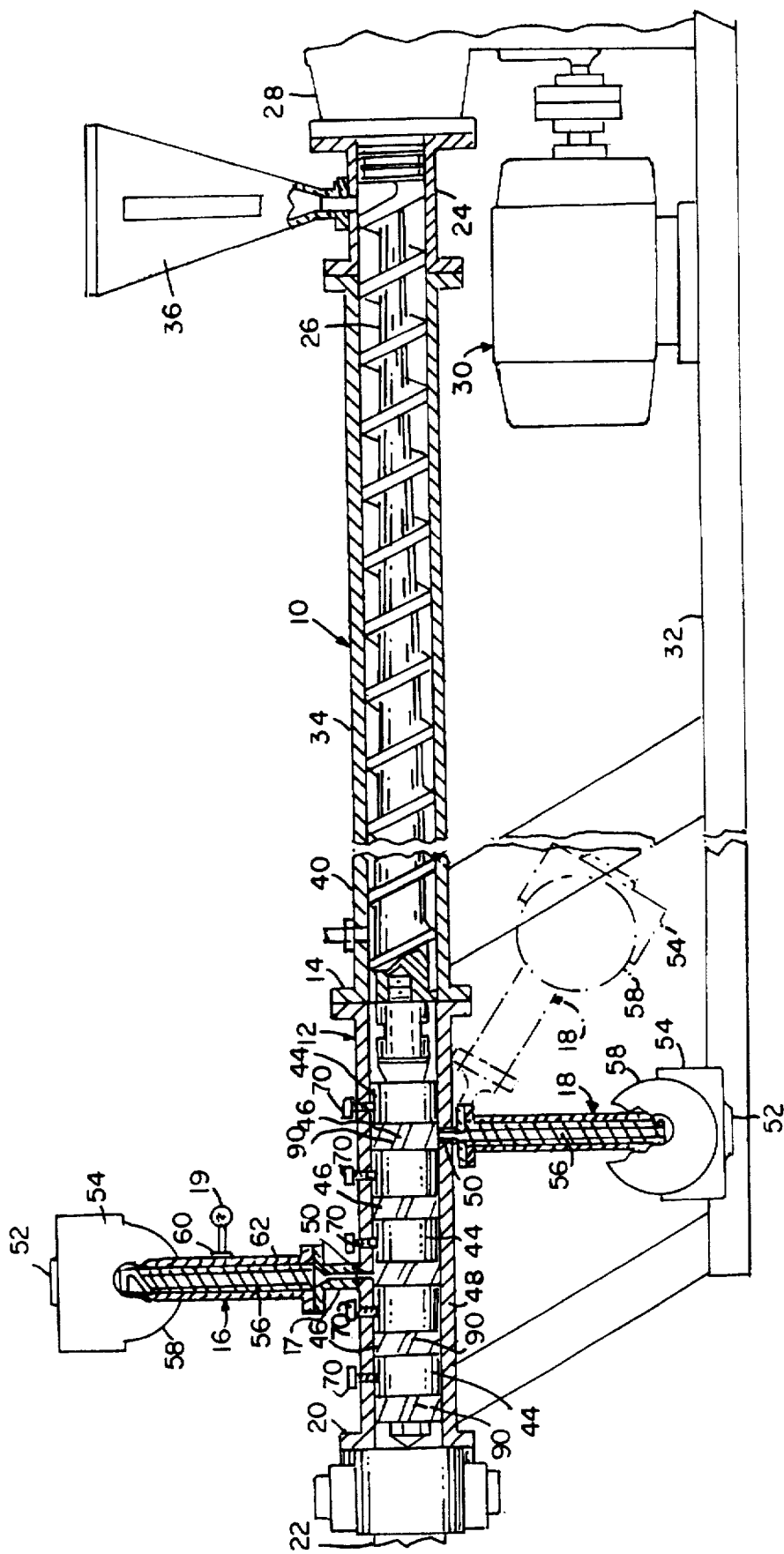
FIG. 1 is a side elevational view of a single screw extruder machine having attached thereto and shown in plan view format, is a dynamic mixer with a plurality of satellite mixer extruders thereattached.

The present invention relates to a single screw main extruder 10 to which is attached a dynamic mixer 12 at its downstream end 14, the dynamic mixer 12 having a plurality of satellite units 16 and 18, (only two shown for this example), feedingly disposed therealong, as shown in FIG. 1. The dynamic mixer 12 has a downstream end 20 with an extrusion die 22 thereon. The main screw extruder 10 has an upstream end 24 with a main shaft 26 rotatably supported therein, the proximal end of which is attached to a reduction gearing 28. The reduction gearing 28 is driven by a motor 30, all of which are mounted on a bedplate 32. The main screw 26 is mounted within an elongated barrel 34, the barrel 34 having a feedhopper 36 through which meltable, mixable material is introduced, so as to enter the barrel 34 and be conveyed and plasticized by the main screw 26. A transition portion 40 comprises the next downstream section from the feed portion of the main extruder 10.

The dynamic mixer 12 comprises a main shaft 42 which has a proximal end which is threadedly engaged with the downstream or distal end of the main screw 46 of the single screw extruder 10. The main shaft 42 of the dynamic mixer 12 has a plurality of stators 44 and rotors 46 spaced alternately thereon, from its upstream end to its distalmost downstream end. The main shaft 42 with the rotors 46 thereon, is caused to rotate due to the mating between the main shaft 42 of the dynamic mixer 12 and the downstream end of the extruder screw 26 of the empowered single screw extruder 10. The dynamic mixer 12 includes a housing 48 which rotatively supports the main shaft 42 therewithin. The housing 48 has a plurality of feedports 50 spaced at longitudinally spaced apart location thereon. Material fed into the main screw extruder hopper 36 typically may be comprised of compounds such as polymers, polyolefins, polystyrene, alloys and/or blends thereof.

Each feedport 50 through the housing 48 of the dynamic mixer 12 may have a satellite extruder 16 or 18 in a supply configuration therewith, through a rigid connector or flexible conduit, 17 either normal to or angularly disposed with respect to the axis of the main shaft 42, shown in phantom in FIG. 1. Each satellite extruder 16 and 18 feeding into the housing 48 of the dynamic mixer 12 has its own individual control panel 52 and drive unit 54, which includes a transmission and motor for propelling a minor screw extruder shaft 56 therewithin. Each minor screw extruder shaft 56 in each satellite extruder 16 or 18 has a hopper feed arrangement 58 at its upstream end, as shown in FIG. 1.

Various satellite extruders such as those shown in FIG. 1, and identified by the numerals 16 and 18 may supply needed components such as colorants, carriers, extenders, fillers, fibers, crosslinking agents, impact modifiers, flame retardants, and substances which may not otherwise survive the mixing process if they were introduced at the upstream end of the housing 48, because of otherwise damaging temperatures, pressures, or mixing characteristics. Each satellite extruder 16 and/or 18 may have a supplemental feed port 60 through its housing barrel 62 therearound, which supplemental feed port 60 may supply high pressure liquid or gas, such as compatabalizers, plasticizers, lubricants, i.e. nitrogen or carbon dioxide, for introduction through that particular satellite extruder 16 or 18, from a high pressure pump 19, into the housing of the dynamic mixer 12.

The feed port 50 from each satellite extruder 16 or 18 is arranged to be disposed radially adjacent a rotor 46 mounted on the main shaft 42 within the dynamic mixer 12. A manifold, for clarity not shown, may convey material through a plurality of conduits, from a single extruder 16 or 18, and into several ports 50 for the simultaneous supply of satellite extruded material. Each stator 44 longitudinally adjacent those ports 50, is maintained in a static relationship with respect to the barrel 48 of the dynamic mixer housing 48. Each stator 44 may be frictionally engaged within the annular interior of the dynamic mixer housing 48, by virtue of its expansion coefficient being greater than the expansion coefficient of the dynamic mixer extruder housing, or each stator 44 may be held in place by a locking means such as a bolt 70 extending through the dynamic mixer housing 48.

Figure 2:
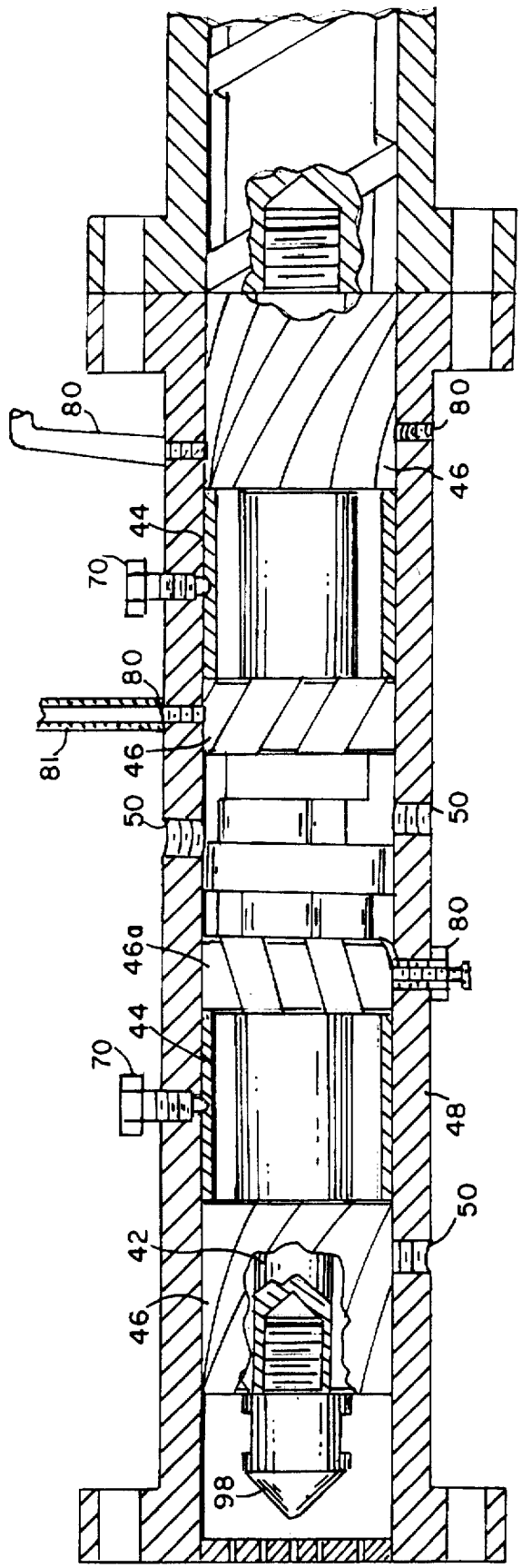
FIG. 2 is a side elevational view of a dynamic mixer extruder showing portions of a rotor and stator and satellite extruder feed ports thereattached.

A further embodiment of the dynamic mixer 12 is shown in FIG. 2, with a plurality of sampling ports 80 shown disposed radially outwardly of each rotor 46. Each sampling port 80 may be comprised of a bore extending through the wall of the elongated housing 48 in the barrel of the dynamic mixer 12. Each rotor portion of that elongated housing 48, may have such sampling ports disposed radially outwardly thereof. Each sampling port 80 may also be arranged to be a supply port by connection with a feed line 81, in communication with a proper source, not shown, for the input of gas colorizers or additives. Such input may also be by the use of the satellite extruders 16 feeding such ports 50 or 80.

Figure 3:
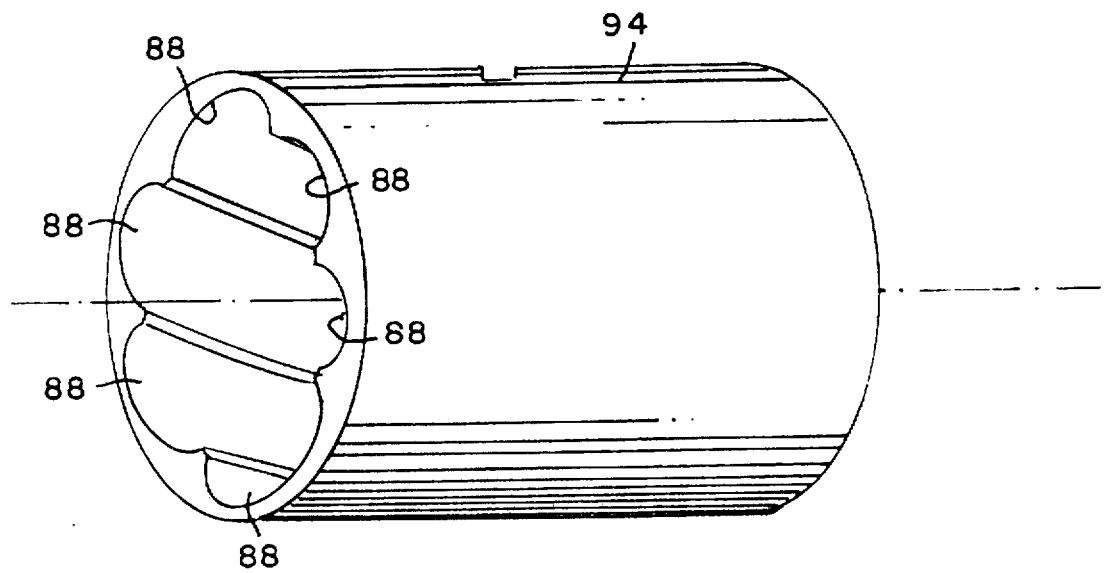
FIG. 3 is a perspective view of a stator utilized in a dynamic mixer.

Each stator 44 of the dynamic mixer 12 has a longitudinal bore 86 therethrough, in which the main shaft 42 of the dynamic mixer 12 rotates, as shown in FIG. 3. The bore 86 within each stator 44 defines an annular surface, each annular surface having a plurality of right-handed or left-handed channels 88 machined therein. Each channel 88 is helically disposed so as to provide circumferential as well as a longitudinal flow to the plastic forced therethrough. Each rotor 46 is rotatively disposed about the main shaft 42 and longitudinally adjacent its respective stator 44, and has a plurality of circumferentially spaced blades 90 thereon. Each blade 90 has a right-handed or left-handed helical disposition, corresponding to the right-handed or left-handed disposition of the grooves/channels 88 in its adjacent upstream stator 44.

Figure 4:
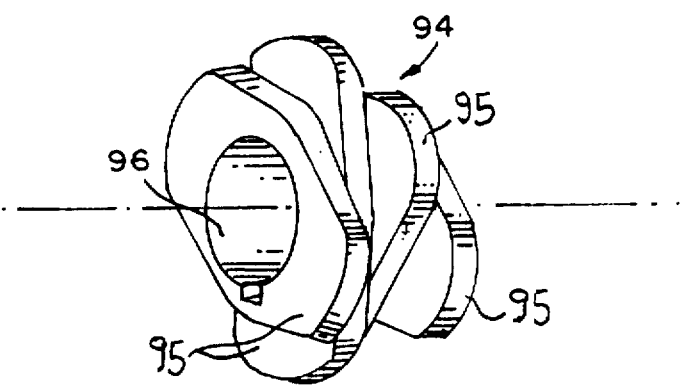
FIG. 4 is a perspective view of a kneader component of a dynamic mixer.

In a further embodiment of the present invention, the blades 90 of any given rotor 46 may be slightly less helically disposed than are the channels 88 of its upstream adjacent stator 44, or of an adjacent rotor 46, as may be seen in FIG. 2. The difference in helical angularity of the blades 90 with respect to the angle of the helically disposed channels 88, permits a slight change in pressure and flow rate of extrudate being mixed thereby. The change in flow rate, permits a change in dwell time of the extrudate within the shear area of the dynamic mixer extruder barrel 48, permitting customizable mixing and extrusion within different portions of the dynamic mixer 12 itself. FIG. 2 shows some rotors 46a and 46b which are longitudinally shorter than the "regular" rotor 46 which is shown secured to the upstream end of the shaft 42. The short rotors 46a and 46b are shown here as of opposite hand. The downstream rotor 46a has a left hand helical blade orientation for material flow retardation from a kneader block arrangement 94. The kneader block arrangement 94, comprises a plurality of angularly and longitudinally spaced-apart, planar, paddle-shaped lobes 95, which is shown in FIG. 4 and performs "dispersive" mixing. The kneader block arrangement 94 has a central bore 96 which permits keying attachment to the dynamic mixer shaft 42. Removal of a choke torpedo 98 at the downstream end of that dynamic mixer shaft 42 permits the rotors 46 and the stators 44 to be slid off and reversed and returned to then shaft 42, to provide opposite hand thereby, or be replaced by components with a slightly different helically disposed channel or blade, to allow customization of the pressure and mix (flow rate) characteristics of the dynamic mixer 12.

By virtue of a plurality of satellite extruders as mentioned hereinabove, plastizers, elastomers, compatabalizers, inks, gas and the like as aforementioned, may be injected at any of a plurality of locations and under any of a plurality of operating perameters within the dynamic mixer extruder barrel to permit a fundamentally customizable melting and mixing extrusion apparatus.

An extrusion die, disposed at the orifice of downstream or distalmost end of the dynamic mixer extruder barrel, may have a choke arrangement thereon to further enhance the dwell time of any extrudate passing therethrough.

Thus, a unique arrangement is shown, wherein a plurality of satellite extruders are feedingly mated with the barrel of a dynamic mixer extruder, to permit a wide variety of additives and mixed components to be fed into the plasticized stream, the dynamic mixer extruder permitting conditions to be monitored along the entire length of the process.

We claim:

1. An extrusion arrangement for the controlled compounding and mixing of a plurality of time, pressure and condition sensitive substances in a single screw plastic extrusion machine, comprising:

a main support shaft of a dynamic melt mixer connected to the downstream end of a single screw plastic extrusion machine, said support shaft enclosed within a barrel shaped housing;

at least one stator secured to an inner surface of said barrel shaped housing, and arranged about said support shaft and one rotor secured onto said support shaft, within said barrel shaped housing;

at least one satellite extrusion feeder arranged to supply an additive to said barrel shaped enclosure through an introduction port, said introduction port arranged at a location radially adjacent said rotor on said support shaft;

said stators having an internal bore therethrough, said internal bore having a plurality of helically disposed channels machined thereon; and each of said rotors having a plurality of blades circumferentially disposed therearound, each of said blades having a helical disposition thereto, said stators arranged to be removed and remounted with respect to said barrel shaped housing, said rotors arranged to be removed with respect to said support shaft to permit reversal thereon, to permit the change of the handedness of the helical disposition of said rotors and said stators.

2. The extrusion arrangement as recited in claim 1, including a sampling port arranged at the lowermost circumferential location on said barrel shaped housing radially adjacent at least one of said rotors.

3. The extrusion arrangement as recited in claim 2, wherein said sampling port has a feed line therewith, to also permit the introduction of additives to locations in said barrel shaped housing at locations radially adjacent to said rotors.

4. The extrusion arrangement as recited in claim 2, wherein said stators are held in a static relationship with said barrel shaped housing by a bolt extending through said barrel shaped housing and against said stator.

5. The extrusion arrangement as recited in claim 1, wherein said support shaft has a kneading block rotor mounted thereon, disposed between a lefthanded helical stator and a righthanded helical stator each mounted within said barrel shaped housing, to provide dispersive mixing and retarding of the flow of plastic therethrough by the opposite handedness of corresponding components within said barrel shaped housing.

6. The extrusion arrangement as recited in claim 5, having an additive port radially adjacent the downstream-most rotor in said barrel shaped housing, so as to permit the introduction of sensitive additives having rapid degradation properties from otherwise losing their important characteristics such as color or viscosity.

7. The extrusion arrangement as recited in claim 1, wherein said satellite extruder is attached to said introduction port through a flexible conduit therebetween, to permit movement and adjustment of the components comprising the system.

8. The extrusion arrangement as recited in claim 1, wherein said satellite extruder is attached to said introduction port through a rigid conduit disposed at an acute angle with respect to the axis of said barrel shaped housing, to minimize the agitation of any additive introduced thereat.

9. The extrusion arrangement as recited in claim 1, wherein said satellite extruder has a pressurizable pump in communication therewith, to permit a fluid to be introduced under pressure into said satellite extruder prior to it being introduced into said barrel shaped housing of said mixer.

10. The extrusion arrangement as recited in claim 1, wherein said barrel shaped housing includes an additive introduction port for the introduction of additives at a location adjacent a rotor therein.

* * * * *